US012633604B2

(12) United States Patent (10) Patent No.: US 12,633,604 B2
Woo (45) Date of Patent: May 19, 2026

(54) RECHARGEABLE BATTERY

(71) Applicant: SAMSUNG SDI CO., LTD., Yongin-si (KR)

(72) Inventor: Byongchul Woo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 804 days.

(21) Appl. No.: 17/922,954

(22) PCT Filed: Jan. 5, 2021

(86) PCT No.: PCT/KR2021/000077
§ 371 (c)(1),
(2) Date: Nov. 2, 2022

(87) PCT Pub. No.: WO2021/246603
PCT Pub. Date: Dec. 9, 2021

(65) Prior Publication Data
US 2023/0170560 A1 Jun. 1, 2023

(30) Foreign Application Priority Data

Jun. 2, 2020 (KR) ........................ 10-2020-0066671

(51) Int. Cl.
*H01M 50/153* (2021.01)
*H01M 50/164* (2021.01)

(52) U.S. Cl.
CPC ....... *H01M 50/153* (2021.01); *H01M 50/164* (2021.01)

(58) Field of Classification Search
CPC ............. H01M 50/153; H01M 50/164; H01M 50/103; H01M 50/15; H01M 50/119;
(Continued)

(56) References Cited

U.S. PATENT DOCUMENTS

| | | | | |
|---|---|---|---|---|
| 4,224,385 | A | * | 9/1980 | Ciliberti, Jr. .......... H01M 50/24 |
| | | | | 429/82 |
| 9,496,581 | B2 | | 11/2016 | Pytlik et al. |
| 2007/0117011 | A1 | | 5/2007 | Myerberg et al. |
| 2013/0236757 | A1 | | 9/2013 | Tikhonov et al. |

(Continued)

FOREIGN PATENT DOCUMENTS

| | | | | | |
|---|---|---|---|---|---|
| EP | | 1826840 | A2 | * | 8/2007 .......... H01M 10/052 |
| JP | | 2009-507345 | A | | 2/2009 |
| KR | 20-1999-0041931 | U | | | 12/1999 |
| KR | 10-2007-0082943 | A | | | 8/2007 |

(Continued)

OTHER PUBLICATIONS

International Search Report for corresponding Application No. PCT/KR2021/000077 dated Apr. 12, 2021, 4pp.

(Continued)

*Primary Examiner* — Ula C Ruddock
*Assistant Examiner* — Sarika Gupta
(74) *Attorney, Agent, or Firm* — Womble Bond Dickinson (US) LLP

(57) ABSTRACT

A rechargeable battery includes: an electrode assembly including a first electrode, a second electrode, and a separator disposed between the first electrode and the second electrode; a case including an opening disposed in one side and receiving the electrode assembly; a cap assembly combined to the opening and closing and sealing the case; a first electrode tab extending from the first electrode and combined to the case; and a second electrode tab extending from the second electrode and combined to the cap assembly, wherein the cap assembly includes a first metal layer contacting the second electrode tab, a second metal layer spaced from the first metal layer and contacting the case, and a first plastic portion insulating between the first metal layer and the second metal layer.

13 Claims, 3 Drawing Sheets

(58) Field of Classification Search
CPC .. H01M 50/10; H01M 50/147; H01M 50/155;
H01M 50/159; H01M 50/169; H01M
50/171; H01M 50/172; H01M 50/176;
H01M 50/528; H01M 50/545; H01M
50/55; H01M 50/553; H01M 50/566;
Y02E 60/10
See application file for complete search history.

(56) References Cited

U.S. PATENT DOCUMENTS

| | | |
|---|---|---|
| 2017/0117516 A1 | 4/2017 | Jung |
| 2022/0037747 A1 | 2/2022 | Lee |

FOREIGN PATENT DOCUMENTS

| | | |
|---|---|---|
| KR | 10-2008-0036249 A | 4/2008 |
| KR | 10-2008-0092842 A | 10/2008 |
| KR | 10-0880385 B1 | 1/2009 |
| KR | 10-2017-0047939 A | 5/2017 |
| KR | 10-2018-0073972 A | 7/2018 |
| KR | 10-2018-0080528 A | 7/2018 |
| KR | 10-2020-0020173 A | 2/2020 |
| KR | 10-2020-0035739 A | 4/2020 |

OTHER PUBLICATIONS

Korean Office Action corresponding to KR Application No. 10-2020-0066671, dated May 27, 2025 (6 pages).
Korean Notice of Allowance dated Jan. 14, 2026, issued in corresponding Korean Patent Application No. 10-2020-0066671 (2 pages).

* cited by examiner

RECHARGEABLE BATTERY

CROSS-REFERENCE TO RELATED APPLICATIONS

This application is a U.S. National Phase Patent Application of International Application Number PCT/KR2021/000077, filed on Jan. 5, 2021, which claims priority to Korean Patent Application Number 10-2020-0066671, filed on Jun. 2, 2020, the entire content of each of which is incorporated herein by reference.

TECHNICAL FIELD

The present disclosure relates to a rechargeable battery.

BACKGROUND ART

In general, a rechargeable battery can be repeatedly charged and discharged.

Recently, as demands on wearable devices such as headphones, earphones, smartwatches, and medical devices attachable to bodies using radio communication such as Bluetooth are recently increasing, needs on very small rechargeable batteries mounted on the wearable devices are increasing.

It is important for the very small rechargeable batteries to obtain electrical capacity required within a restricted size, sufficient lightness of weight, and structural stability.

DISCLOSURE

The present invention has been made in an effort to provide a rechargeable battery for achieving sufficient weight reduction, increasing electrical capacity, and efficiently increasing structural stability.

An embodiment of the present invention provides a rechargeable battery including: an electrode assembly including a first electrode, a second electrode, and a separator disposed between the first electrode and the second electrode; a case including an opening disposed in one side and receiving the electrode assembly; a cap assembly combined to the opening and closing and sealing the case; a first electrode tab extending from the first electrode and combined to the case; and a second electrode tab extending from the second electrode and combined to the cap assembly, wherein the cap assembly includes a first metal layer contacting the second electrode tab, a second metal layer spaced from the first metal layer and contacting the case, and a first plastic portion insulating between the first metal layer and the second metal layer.

The second metal layer may have a ring shape, and an internal edge of the second metal layer may surround an external edge of the first metal layer.

The external edge of the first metal layer may have a reverse staircase form, and the internal edge of the second metal layer may have a staircase form.

Upper surfaces of the respective first metal layer, the first plastic portion, and the second metal layer may be disposed on a same plane.

The cap assembly may further include a second plastic portion surrounding an external edge of the second metal layer, and the case may further include a third plastic portion surrounding a side wall for forming the opening corresponding to the second plastic portion and bonded to the second plastic portion.

The second metal layer may not be bonded to the side wall of the case.

The external edge of the second metal layer may have a staircase form.

The second plastic portion may extend in a lower direction from the external edge of the second metal layer and may cover an upper terminal of the side wall of the case, and the third plastic portion may be disposed lower than the upper terminal of the side wall.

The second plastic portion may completely cover the external edge of the second metal layer and the upper terminal of the side wall of the case.

The second metal layer may contact the upper terminal of the side wall of the case.

One of the second plastic portion and the third plastic portion may have greater transparency than the other thereof.

A space between the second plastic portion and the third plastic portion may be fused by use of laser beams.

The first metal layer may have a same polarity as the second electrode, and the second metal layer may have a same polarity as the first electrode.

An upper side of the electrode assembly may face the cap assembly, a lower side thereof may face a bottom portion of the case, the first electrode tab may extend from the lower side of the electrode assembly and may be combined to the bottom portion of the case, and the second electrode tab may extend from the upper side of the electrode assembly and may be combined to the first metal layer of the cap assembly.

The rechargeable battery may have a ratio of a height to a diameter that is equal to or less than 1.

According to the embodiment, the rechargeable battery for achieving sufficient weight reduction, increasing electrical capacity, and efficiently increasing structural stability is provided.

MODE FOR INVENTION

In the following detailed description, only certain embodiments of the present invention have been shown and described, simply by way of illustration. As those skilled in the art would realize, the described embodiments may be modified in various different ways, all without departing from the spirit or scope of the present invention.

Unless explicitly described to the contrary, the word "comprise" and variations such as "comprises" or "comprising" will be understood to imply the inclusion of stated elements but not the exclusion of any other elements.

A rechargeable battery according to an embodiment will now be described with reference to FIG. 1 to FIG. 3.

The rechargeable battery according to an embodiment is a very small rechargeable battery, and it may be a coin cell or button cell, and without being limited thereto, it may be a cylindrical or pin-type cell.

The coin cell or the button cell is a battery in a thin coin shape or a button shape, and it represents the battery of which a ratio of a height to a battery diameter is equal to or less than 1, and is not limited thereto.

The cross-section of the coin cell or the button cell in a horizontal direction may be circular, and without being limited, it may also be oval or polygonal.

Figure 1:
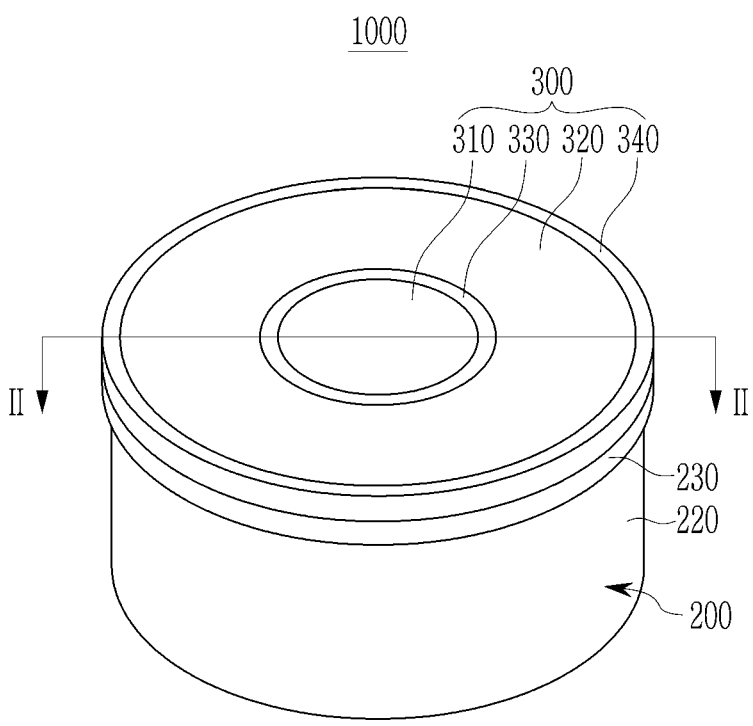
FIG. 1 shows a perspective view of a rechargeable battery according to an embodiment.

FIG. 1 shows a perspective view of a rechargeable battery according to an embodiment. FIG. 2 shows a cross-sectional view with respect to a line II-II of FIG. 1.

Figure 2:
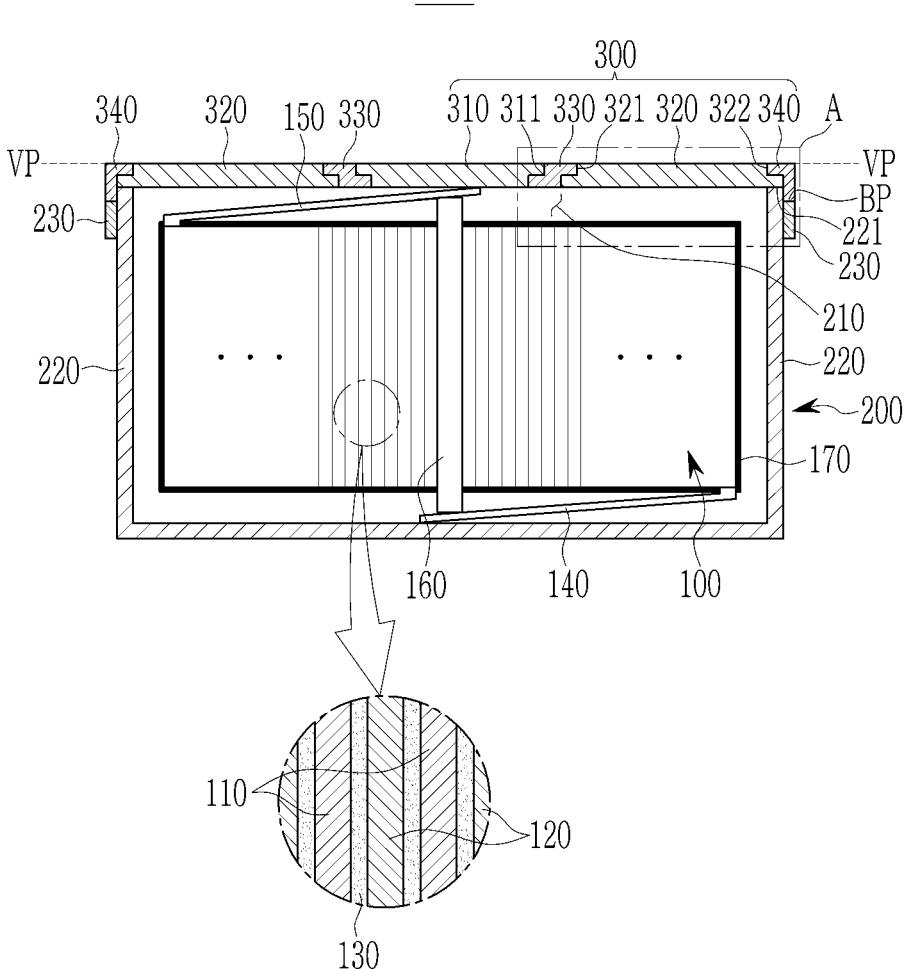
FIG. 2 shows a cross-sectional view with respect to a line II-II of FIG. 1.

Referring to FIG. 1 and FIG. 2, the rechargeable battery 1000 according to an embodiment includes an electrode assembly 100, a case 200, and a cap assembly 300.

The electrode assembly 100 is received into the case 200. A lower side of the electrode assembly 100 faces a bottom portion of the case 200, and an upper side of the electrode assembly 100 faces the cap assembly 300 covering an opening 210 of the case 200. The lower side and the upper side of the electrode assembly 100 may have planar shapes parallel to each other, and are not limited thereto.

The electrode assembly 100 includes a first electrode 110, a second electrode 120, a separator 130, a first electrode tab 140, a second electrode tab 150, a center pin 160, and an insulation member 170.

The first electrode 110 is spaced from the second electrode 120, and the separator 130 including an insulation material is positioned between the first electrode 110 and the second electrode 120. The first electrode 110 may be an anode and the second electrode 120 may be a cathode, and without being limited thereto, the first electrode 110 may be a cathode and the second electrode 120 may be an anode.

The first electrode 110 has a band shape extending in one direction, and includes an anode coated region in which an anode active material layer is applied to a current collector of a metal foil (for example, a Cu foil), and an anode uncoated region in which no active material is applied. The anode uncoated region may be positioned at one end in the extending direction of the first electrode 110.

The second electrode 120 is spaced from the first electrode 110 with the separator 130 therebetween, has a band form extending in one direction, and includes a cathode coated region in which a cathode active material layer is applied to the current collector of a metal foil (for example, an Al foil) and a cathode uncoated region in which no active material is applied. The cathode uncoated region may be positioned on one end in the extending direction of the second electrode 120.

The separator 130 extends in one direction between the first electrode 110 and the second electrode 120 to prevent a short-circuit between the first electrode 110 and the second electrode 120.

The first electrode 110, the separator 130, and the second electrode 120 may be sequentially stacked to have a jelly roll shape wound altogether with respect to the center pin 160, and without being limited thereto, they may be formed in various ways. The first electrode 110, the second electrode 120, and the separator 130 may respectively include various types of known materials.

The first electrode tab 140 extends to the case 200 from the first electrode 110 of the electrode assembly 100 and is combined to the bottom portion of the case 200. The first electrode tab 140 electrically connects a space between the first electrode 110 and the case 200. The first electrode tab 140 contacts the first electrode 110 and the case 200. By the first electrode tab 140, the case 200 has the same polarity (for example, an anode) as the first electrode 110. The first electrode tab 140 may be combined to the case 200 by using a combination means, and they may be directly combined to each other by a combination method such as welding. The first electrode tab 140 may not be included in the electrode assembly 100.

The second electrode tab 150 extends to the first metal layer 310 of the cap assembly 300 from the second electrode 120 of the electrode assembly 100. The second electrode tab 150 electrically connects a space between the second electrode 120 and the first metal layer 310 of the cap assembly 300. The second electrode tab 150 contacts the second electrode 120 and the first metal layer 310 of the cap assembly 300. By the second electrode tab 150, the first metal layer 310 of the cap assembly 300 has the same polarity (for example, a cathode) as the second electrode 120. The second electrode tab 150 may be combined to the cap assembly 300 by using a combination means, and they may be directly combined to each other by a combination method such as welding. The second electrode tab 150 may not be included in the electrode assembly 100.

The center pin 160 has a jelly roll shape, penetrates through a center of the wound electrode assembly 100, and supports the first electrode tab 140 and the second electrode tab 150. An upper end of the center pin 160 protrudes to the first metal layer 310 of the cap assembly 300 from the upper side of the electrode assembly 100, and a lower end of the center pin 160 protrudes to the bottom portion of the case 200 from the lower side of the electrode assembly 100. The second electrode tab 150 is supported by the upper end of the center pin 160 and is welded to the first metal layer 310 of the cap assembly 300, and the first electrode tab 140 is supported by the lower end of the center pin 160 and is welded to the bottom portion of the case 200. The center pin 160 includes an electrical insulation material, and the center pin 160 may not be included in the electrode assembly 100.

The insulation member 170 surrounds the electrode assembly 100 between the electrode assembly 100 and the case 200, and insulates a space between the electrode assembly 100 and the case 200. The insulation member 170 includes an electrical insulation material such as a polymer, and it may surround the electrode assembly 100 in a film form, or may be applied to the electrode assembly 200 in a liquefied form and may then be hardened. The insulation member 170 may not be included in the electrode assembly 100.

The case 200 receives the electrode assembly 100. The case 200 includes an opening 210 for exposing the upper side of the electrode assembly 100. Without being limited thereto, the opening 210 of the case 200 may be positioned on one side of the case 200. The bottom portion of the case 200 is connected to the first electrode 110 of the electrode assembly 100 by the first electrode tab 140 and has the same polarity (for example, an anode) as the first electrode 110. The case 200 has a cylindrical shape in a jelly roll shape for receiving the electrode assembly 100, and without being limited thereto, it may have various types of known shapes.

The case 200 further includes a third plastic portion 230 corresponding to the second plastic portion 340 of the cap assembly 300 and surrounding the side wall 220 of the case 200 for forming the opening 210. The third plastic portion 230 is positioned lower than an upper terminal 221 of the side wall 220 of the case 200 and is bonded to the second plastic portion 340 of the cap assembly 300 for covering the upper terminal 221.

The case 200 may receive various types of known electrolyte solutions together with the electrode assembly 100.

Figure 3:
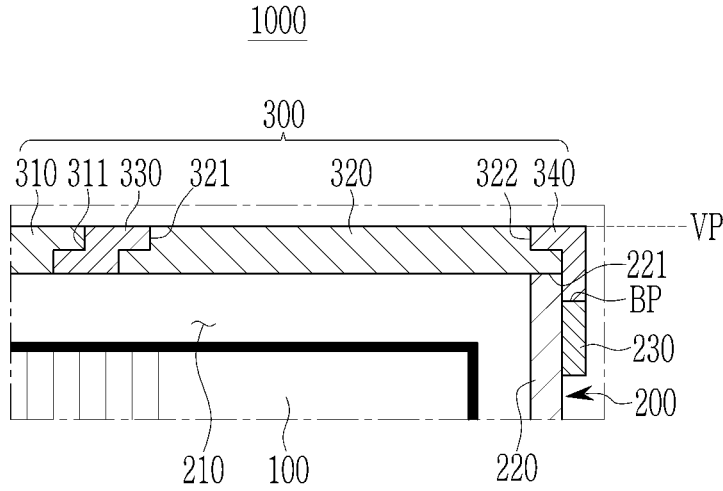
FIG. 3 shows an enlarged cross-sectional view of a portion A of FIG. 2.

FIG. 3 shows an enlarged cross-sectional view of a portion A of FIG. 2.

Referring to FIG. 1 to FIG. 3, the cap assembly 300 is combined to the opening 210 of the case 200 to close and seal an inside of the case 200 into which the electrode assembly 100 is received.

The cap assembly 300 includes a first metal layer 310, a second metal layer 320, a first plastic portion 330, and a second plastic portion 340. Upper surfaces of the respective first metal layer 310, the second metal layer 320, the first plastic portion 330, and the second plastic portion 340 are positioned on a same virtual plane (VP). The upper surfaces of the respective first metal layer 310, the second metal layer 320, the first plastic portion 330, and the second plastic portion 340 are positioned on the same virtual plane (VP) so generation of interference in a lateral direction of the rechargeable battery 1000 on the upper surface of the cap assembly 300 is suppressed.

The first metal layer 310 contacts the second electrode tab 150. The first metal layer 310 covers a center area of the opening 210 of the case 200. The first metal layer 310 contacts the second electrode tab 150 positioned on the upper side of the electrode assembly 100 and is connected to the second electrode 120 of the electrode assembly 100. The first metal layer 310 has the same polarity (for example, a cathode) as the second electrode 120. The first metal layer 310 has a disk shape in a plan view, and is not limited thereto. An external edge 311 of the first metal layer 310 has a reverse staircase form.

In another embodiment, an external edge of the first metal layer 310, an internal edge of the second metal layer 320, and an external edge of the second metal layer 320 may respectively have a convex or concave structure to increase a bonding force to the plastic portion.

The external edge 311 of the first metal layer 310 is surrounded by the first plastic portion 330, and the first metal layer 310 is electrically connected to the second metal layer 320 by the first plastic portion 330.

The second metal layer 320 is spaced from the first metal layer 310, and contacts the side wall 220 of the case 200. The second metal layer 320 contacts the upper terminal 221 of the side wall 220 of the case 200. The second metal layer 320 is combined to the case 200 to cover an external area of the opening 210 of the case 200. The second metal layer 320 is not bonded to the side wall 220 of the case 200. The second metal layer 320 contacts the case 200 to have the same polarity (for example, an anode) as the first electrode 110. The second metal layer 320 has a ring shape, and an internal edge 321 of the second metal layer 320 surrounds the external edge 311 of the first metal layer 310. The internal edge 321 of the second metal layer 320 has a staircase form. An external edge 322 of the second metal layer 320 has a staircase form, and the external edge 322 of the second metal layer 320 is supported by the side wall 220 of the case 200.

The first plastic portion 330 is positioned between the first metal layer 310 and the second metal layer 320, and insulates a space between the first metal layer 310 and the second metal layer 320. The first plastic portion 330 has a ring shape in a plan view, and connects a space between the external edge 311 of the first metal layer 310 and the internal edge 321 of the second metal layer 320. The first plastic portion 330 bonds a space between the first metal layer 310 and the second metal layer 320. The first plastic portion 330 bonds a space between the internal edge 321 of the second metal layer 320 and the external edge 311 of the first metal layer 310, the internal edge 321 of the second metal layer 320 has a staircase form, the external edge 311 of the first metal layer 310 has a reverse staircase form so the first plastic portion 330 is supported by the internal edge 321 of the second metal layer 320, and the external edge 311 of the first metal layer 310 is supported by the first plastic portion 330, and hence, the first metal layer 310 is suppressed from leaving the cap assembly 300 by a pressure applied into the rechargeable battery 1000 from the outside thereof.

The first plastic portion 330 bonds a space between the internal edge 321 of the second metal layer 320 and the external edge 311 of the first metal layer 310, the internal edge 321 of the second metal layer 320 has a staircase form, and the external edge 311 of the first metal layer 310 has a reverse staircase form so a convex or concave structure is formed on the edge of the first metal layer 310 and the edge of the second metal layer 320 and a cross-section of the bonded side increases, thereby increasing the bonding force between the metal layers and the plastic portion.

The second plastic portion 340 surrounds the external edge 322 of the second metal layer 320. The second plastic portion 340 has a ring shape in a plan view, and surrounds the external edge 322 of the second metal layer 320 in a staircase form. The second plastic portion 340 extends in a lower direction from the external edge 322 of the second metal layer 320 to cover the upper terminal 221 of the side wall 220 of the case 200 in a lateral direction. The second plastic portion 340 completely covers the external edge 322 of the second metal layer 320 and the upper terminal 221 of the side wall 220 of the case 200. The second plastic portion 340 is bonded to the third plastic portion 230 surrounding the side wall 220 of the case 200. A bonded portion BP between the second plastic portion 340 and the third plastic portion 230 may be generated by laser beams, heat, or chemical etching, and it is not limited thereto.

For example, one of the second plastic portion 340 and the third plastic portion 230 has greater transparency than the other thereof, and the bonded portion BP between the second plastic portion 340 and the third plastic portion 230 may be fused by heat when laser beams are transmitted through the plastic portion with greater transparency from among the two plastic portions, but is not limited thereto.

For another example, when the second plastic portion 340 has greater transparency than the third plastic portion 230, the second plastic portion 340 becomes a transmitter, the third plastic portion 230 becomes an absorber, the laser beams are transmitted through the second plastic portion 340, and the bonded portion BP between the second plastic portion 340 and the third plastic portion 230 may be fused by the heat caused by the laser beams.

For another example, when the third plastic portion 230 has greater transparency than the second plastic portion 340, the third plastic portion 230 becomes a transmitter, the second plastic portion 340 becomes an absorber, the laser beams are transmitted through the third plastic portion 230, and the bonded portion BP between the second plastic portion 340 and the third plastic portion 230 may be fused by the heat caused by the laser beams.

As the second plastic portion 340 of the cap assembly 300 is bonded to the third plastic portion 230 of the case 200, the second metal layer 320 of the cap assembly 300 contacts the side wall 220 of the case 200 to have the same polarity (for example, anode) as the first electrode 110, and while the first metal layer 310 of the cap assembly 300 has the same polarity (for example, a cathode) as the second electrode 120, the cap assembly 300 is bonded to the case 200 and the electrode assembly 100 is closed and sealed in the case 200.

As the cap assembly 300 includes the first plastic portion 330 and the second plastic portion 340, a weight of the cap assembly 300 is reduced compared to the case in which the cap assembly 300 is made of a metal material, so the entire weight of the rechargeable battery 1000 is reduced.

As the cap assembly 300 simultaneously includes the first metal layer 310 and the second metal layer 320 that are made of metal materials and the first plastic portion 330 and the second plastic portion 340 that are made of plastic materials, rigidity of the cap assembly 300 may be increased by combining a physical property of the plastic material and a physical property of the metal material, and the entire structural stability of rechargeable battery 1000 may be increased.

By bonding the second plastic portion 340 that is a plastic material of the cap assembly 300 and the third plastic portion 230 that is a plastic material of the case 200, the cap assembly 300 may be bonded to the case 200 at a low temperature, compared to the case in which the cap assembly of the metal material is directly welded to the case of the metal material. While the rechargeable battery 1000 is manufactured by receiving the electrode assembly 100 into the case 200 and bonding the cap assembly 300 to the case 200, a space between the second plastic portion 340 that is the plastic material of the cap assembly 300 and the third plastic portion 230 that is the plastic material of the case 200 is bonded at a low temperature so damage applied to the separator 130 of the electrode assembly 100 by the heat generated in the bonding process is minimized, spatial utility in the case 200 is increased, the size of the electrode assembly 100 is maximized, and electrical capacity of the rechargeable battery 1000 may be increased.

Regarding the rechargeable battery 1000, the cap assembly 300 includes the first plastic portion 330 and the second plastic portion 340, thereby reducing the weight of the cap assembly 300 and acquiring a reduction of weight of the rechargeable battery 1000, compared to the case in which the cap assembly 300 is made of a metal material.

The first plastic portion 330 of the cap assembly 300 bonds a space between the internal edge 321 of the second metal layer 320 and the external edge 311 of the first metal layer 310, the internal edge 321 of the second metal layer 320 has a staircase form, and the external edge 311 of the first metal layer 310 has a reverse staircase form so the first plastic portion 330 is supported by the internal edge 321 of the second metal layer 320 and the external edge 311 of the first metal layer 310 is supported by the first plastic portion 330, and the first metal layer 310 is suppressed from leaving the cap assembly 300 by the pressure applied into the rechargeable battery 1000 from the outside thereof.

Further, a convex or concave structure is formed at the edge of the first metal layer 310 and the edge of the second metal layer 320, and the cross-section of the bonded side between the metal layers and the plastic portion is increased so the bonding force between the metal layers and the plastic portion is increased.

Further, as the cap assembly 300 includes the first metal layer 310 and the second metal layer 320 that are made of metal materials and the first plastic portion 330 and the second plastic portion 340 that are made of plastic materials, the rigidity of the cap assembly 300 may be increased by combining a physical property of the plastic material and a physical property of the metal material, and the entire structural stability of the rechargeable battery 1000 may be increased.

The second plastic portion 340 that is a plastic material of the cap assembly 300 is bonded to the third plastic portion 230 that is a plastic material of the case 200 at a low temperature, and the cap assembly 300 is bonded to the case 200 at the low temperature so in the process for manufacturing the rechargeable battery 1000, the damage applied to the separator 130 of the electrode assembly 100 received into the case 200 by the heat generated when the cap assembly 300 is bonded to the case 200 is minimized, the size of the electrode assembly 100 received into the case 200 is maximized, and the electrical capacity of the rechargeable battery 1000 may be increased.

That is, the rechargeable battery for increasing weight reduction and structural stability and also increasing electrical capacity by including the cap assembly 300 including the first metal layer 310, the second metal layer 320, the first plastic portion 330, and the second plastic portion 340 is provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS electrode assembly 100, case 200, cap assembly 300, first electrode tab 140, second electrode tab 150, first metal layer 310, second metal layer 320, first plastic portion 330

The invention claimed is:

1. A rechargeable battery comprising:

an electrode assembly including a first electrode, second electrode, and a separator between the first electrode and the second electrode;

a case including an opening in one side and wherein the electrode assembly is received in the case;

a cap assembly at the opening and closing and sealing the case;

a first electrode tab extending from the first electrode and connected to the case; and a second electrode tab extending from the second electrode and connected to the cap assembly, wherein the cap assembly comprises:

a first metal layer contacting the second electrode tab, a second metal layer spaced from the first metal layer and contacting the case, and a first plastic portion insulating the first metal layer from the second metal layer, and wherein the cap assembly further comprises a second plastic portion surrounding an external edge of the second metal layer, and the case further comprises a third plastic portion surrounding a side wall of the case and bonded to the second plastic portion, and wherein one of the second plastic portion or the third plastic portion has greater transparency than the other.

2. The rechargeable battery of claim 1, wherein the second metal layer has a ring shape, and an internal edge of the second metal layer surrounds an external edge of the first metal layer.

3. The rechargeable battery of claim 2, wherein the external edge of the first metal layer has a reverse staircase form, and the internal edge of the second metal layer has a staircase form.

4. A rechargeable battery comprising:

an electrode assembly including a first electrode, second electrode, and a separator between the first electrode and the second electrode;

a case including an opening in one side and wherein the electrode assembly is received in the case;

a cap assembly at the opening and closing and sealing the case;

a first electrode tab extending from the first electrode and connected to the case; and a second electrode tab extending from the second electrode and connected to the cap assembly wherein the cap assembly comprises:

a first metal layer contacting the second electrode tab, a second metal layer spaced from the first metal layer and contacting the case, and a first plastic portion insulating the first metal layer from the second metal layer, and wherein upper surfaces of each of the first metal layer, the first plastic portion, and the second metal layer are on a same plane.

5. The rechargeable battery of claim 1, wherein the second metal layer is not bonded to the side wall of the case.

6. The rechargeable battery of claim 1, wherein the external edge of the second metal layer has a staircase form.

7. The rechargeable battery of claim 1, wherein the second plastic portion extends in a lower direction from the external edge of the second metal layer and covers an upper terminal of the side wall of the case, and the third plastic portion is disposed lower than the upper terminal of the side wall.

8. The rechargeable battery of claim 7, wherein the second plastic portion completely covers the external edge of the second metal layer and the upper terminal of the side wall of the case.

9. The rechargeable battery of claim 7, wherein the second metal layer contacts the upper terminal of the side wall of the case.

10. The rechargeable battery of claim 1, wherein a space between the second plastic portion and the third plastic portion is fused by use of laser beams.

11. The rechargeable battery of claim 1, wherein the first metal layer has a same polarity as the second electrode, and the second metal layer has a same polarity as the first electrode.

12. The rechargeable battery of claim 1, wherein an upper side of the electrode assembly faces the cap assembly, and a lower side thereof faces a bottom portion of the case, the first electrode tab extends from the lower side of the electrode assembly and is connected to the bottom portion of the case, and the second electrode tab extends from the upper side of the electrode assembly and is connected to the first metal layer of the cap assembly.

13. The rechargeable battery of claim 1, wherein the rechargeable battery has a ratio of a height to a diameter that is equal to or less than 1.

* * * * *